United States Patent
Smith et al.

(10) Patent No.: US 6,883,407 B2
(45) Date of Patent: Apr. 26, 2005

(54) EXPANDING COLLET ASSEMBLY FOR PICK-OFF SPINDLE

(75) Inventors: Roger R. Smith, Erin, NY (US); Matthew C. Roberts, Jr., Bath, NY (US)

(73) Assignee: Hardinge Inc., Elmira, NY (US)

( * ) Notice: Subject to any disclaimer, the term of this patent is extended or adjusted under 35 U.S.C. 154(b) by 215 days.

(21) Appl. No.: 10/231,382

(22) Filed: Aug. 30, 2002

(65) Prior Publication Data

US 2004/0040424 A1 Mar. 4, 2004

(51) Int. Cl.[7] .............................................. B23B 15/00
(52) U.S. Cl. ..................... 82/124; 82/1.11; 279/2.11; 279/155; 279/2.03
(58) Field of Search ..................... 82/124, 1.11, 127; 279/2.03, 2.12, 58, 2.1, 2.17, 2.11, 155

(56) References Cited

U.S. PATENT DOCUMENTS

| | | | | |
|---|---|---|---|---|
| 2,732,213 A | * | 1/1956 | Drew | 279/2.03 |
| 2,733,924 A | | 2/1956 | Lipton | |
| 2,851,274 A | | 9/1958 | Greer | |
| 2,877,022 A | * | 3/1959 | Parker et al. | 279/2.03 |
| 2,929,635 A | * | 3/1960 | Czerenda | 279/2.03 |
| 3,104,885 A | * | 9/1963 | Dunham | 279/2.03 |
| 3,490,778 A | * | 1/1970 | Parker | 279/2.04 |
| 3,608,915 A | * | 9/1971 | Hohwart | 279/156 |
| 3,861,692 A | * | 1/1975 | Patzer | 279/2.04 |
| 3,909,021 A | * | 9/1975 | Morawski | 279/2.04 |
| 4,088,332 A | * | 5/1978 | Chase | 279/2.04 |
| 4,121,847 A | * | 10/1978 | Morawski | 279/2.04 |
| 4,373,411 A | * | 2/1983 | Kanakaris | 82/169 |
| 4,416,459 A | * | 11/1983 | Morawski et al. | 279/2.04 |
| 4,540,187 A | * | 9/1985 | Morawski et al. | 279/2.04 |
| 5,133,565 A | * | 7/1992 | Schmidt | 279/2.04 |
| 5,154,105 A | * | 10/1992 | Berdich | 279/155 |
| 5,207,135 A | | 5/1993 | Babuder | |
| 5,787,771 A | * | 8/1998 | Ogawa et al. | 82/1.11 |
| 6,149,357 A | * | 11/2000 | Skellon | 279/2.03 |

FOREIGN PATENT DOCUMENTS

| | | |
|---|---|---|
| DE | 859247 | 12/1952 |
| DE | 1074362 | 1/1960 |
| DE | 2306910 | 8/1973 |
| SU | 831404 | 5/1981 |

* cited by examiner

*Primary Examiner*—Daniel W. Howell
*Assistant Examiner*—Dana Ross
(74) *Attorney, Agent, or Firm*—Pillsbury Winthrop LLP

(57) ABSTRACT

An expanding, inner diameter gripping collet assembly for a pick-off spindle. An arbor base is connected to the pick-off spindle and is moveably connected to a moveable arbor. The moveable arbor engages and is driven by the pick-off spindle nose. The moveable arbor has motion-translating cam surfaces on one end that engage corresponding surfaces on one end of an expanding collet. A drawplug having motion-translating cam surfaces that engage corresponding ones on the other end of an expanding collet is inserted through the moveable arbor and secured into the arbor base. The collet assembly also includes an ejector housing, in which an ejector is positioned for sliding movement. A compression spring biases the ejector forwardly.

14 Claims, 6 Drawing Sheets

US 6,883,407 B2

EXPANDING COLLET ASSEMBLY FOR PICK-OFF SPINDLE

BACKGROUND OF THE INVENTION

1. Field of the Invention

The present invention relates to a collet chuck assembly for holding a tool or workpiece on a spindle of a lathe.

2. Description of Related Art

Collet chucks are used to clamp or grip workpieces or tools in turning machines, such as lathes. The collet head inside the chuck includes a number of circumferentially-spaced gripping segments and a number of cam surfaces. When the collet head is moved axially, its cam surfaces interact with corresponding opposing surfaces or cams on the mounting fixture. The interaction of the opposing cam surfaces causes the gripping segments of the collet head to expand or contract, thus causing it to grip or release a workpiece or tool, depending on the direction of axial movement.

Collet chucks are commonly used in place of other types of chucks, especially for smaller workpieces, because they are typically more accurate and can transmit more torque than a conventional chuck, such as a jaw chuck. Collet chucks generally maintain their grip at high rotational speeds, whereas the centrifugal forces present at high rotational speeds may cause a conventional jaw chuck to loosen its grip on the workpiece.

In modern multi-spindle lathes, pick-off spindles are used in addition to the main spindle or spindles. After work on a part is completed on the main spindle, the pick-off spindle is used to remove the part from the main spindle and hold it so that it can be cut from the bar stock from which it is formed. Once the part is cut from the bar stock, the pick-off spindle holds the part while machining or finishing work is performed on the cut end. A multi-spindle lathe of this type and a typical process for employing a pick-off spindle are disclosed in U.S. Pat. No. 5,207,135, the contents of which are incorporated by reference herein in their entirety.

Typically, pick-off spindle collet heads are designed to grip the outer diameter (OD) of the workpiece by contracting to grip the workpiece and expanding to release it. A forward motion of the pick-off spindle nose is usually used to close the collet head around a workpiece, while a rearward motion of the pick-off spindle nose is used to open the collet head. One disadvantage of these typical pick-off spindle collets is that OD gripping limits the area of the workpiece that may be machined, because the area being gripped by the collet head cannot be machined.

Inner diameter (ID) gripping collets that grip a workpiece along an inner circumferential surface have also been used with the pick-off spindles of multi-spindle lathes. However, conventional ID gripping collets may be inconvenient to use because these collets typically require a rearward motion of the pick-off spindle nose in order to expand and grip a workpiece, the opposite motion required of an OD gripping collet.

SUMMARY OF THE INVENTION

One aspect of the invention relates to an expanding collet assembly. The expanding collet assembly includes a moveable arbor and an expanding collet. The moveable arbor has first surfaces constructed and arranged to slidingly engage a pick-off spindle nose so as to place the moveable arbor in driven relation with the pick-off spindle nose. Second motion-translating surfaces of the expanding collet assembly are constructed and arranged to slidingly engage the expanding collet to drive the collet between expanded workpiece-gripping positions and contracted position thereof. The expanding collet has one or more sets of collet motion-translating surfaces, at least one of the sets of motion-translating surfaces corresponding to the second motion-translating surfaces of the moveable arbor. The motion-translating surfaces of the expanding collet are constructed and arranged to engage the second motion-translating surfaces of the moveable arbor. The collet and second motion-translating surfaces are contoured so as to drive the expanding collet into the expanded workpiece-gripping position in response to an axially forward motion of the moveable arbor. The expanding collet is adapted to grip an inner circumferential surface of a workpiece.

Another aspect of the invention relates to an inner diameter gripping collet assembly for a pick-off spindle. The collet assembly includes an arbor base, a moveable arbor, an ejector housing, an ejector, an elongate drawplug, and an expanding collet. A first end of the arbor base provides a connecting portion adapted for connection to a pick-off spindle. A second end of the arbor base includes resiliently moveable connecting structure. The arbor base defines a cavity in at least a portion thereof.

The moveable arbor is adapted to receive the resiliently moveable connecting structure of the arbor base so as to be connected to the arbor base for resilient movement between base-adjacent and axially forward positions along a central axis. The moveable arbor defines a cavity therethrough, the cavity being oriented parallel to the central axis. The moveable arbor also includes outer surfaces constructed and arranged to slidingly engage corresponding inner surfaces of a pick-off spindle nose so as to be in driven, motion-transmitting relation therewith, motion-translating surfaces, and ejector housing connecting structure on a portion thereof.

The ejector housing is adapted to be connected to the moveable arbor by the ejector housing connecting structure. The ejector housing has retaining structure on an interior surface thereof. The ejector is adapted to be disposed within and retained by the ejector housing for resilient movement between workpiece-engaged and workpiece-ejected positions. The ejector has surfaces adapted to contact and eject a workpiece and retaining structure adapted to cooperate with the retaining structure of the ejector housing so as to retain the ejector within the ejector housing.

The drawplug is adapted to be inserted parallel to the central axis into the cavity of the moveable arbor and secured into the arbor base. One end of the drawplug has motion-translating surfaces;

The expanding collet has two sets of motion-translating collet surfaces. A first set of motion-translating surfaces is constructed and adapted to engage the motion-translating surfaces of the moveable arbor. A second set of motion-translating collet surfaces is adapted to engage the motion-translating surfaces of the drawplug so as to place the expanding collet in grippingly-driven relation with respect to the moveable arbor. In this way, the expanding collet is expanded when the moveable arbor is in the axially forward position and contracted when the moveable arbor is in the base-adjacent position.

A further aspect of the invention relates to turning machines having installed therein collet assemblies as described above.

Another further aspect of the invention relates to a method of machining a workpiece that is integrally formed with bar stock.

These and other aspects of the invention will be described below in more detail.

BRIEF DESCRIPTION OF THE DRAWINGS

The invention will be described with respect to the following Drawings, in which like numerals represent like features throughout the several Figures, and in which.

DETAILED DESCRIPTION

Figure 1:
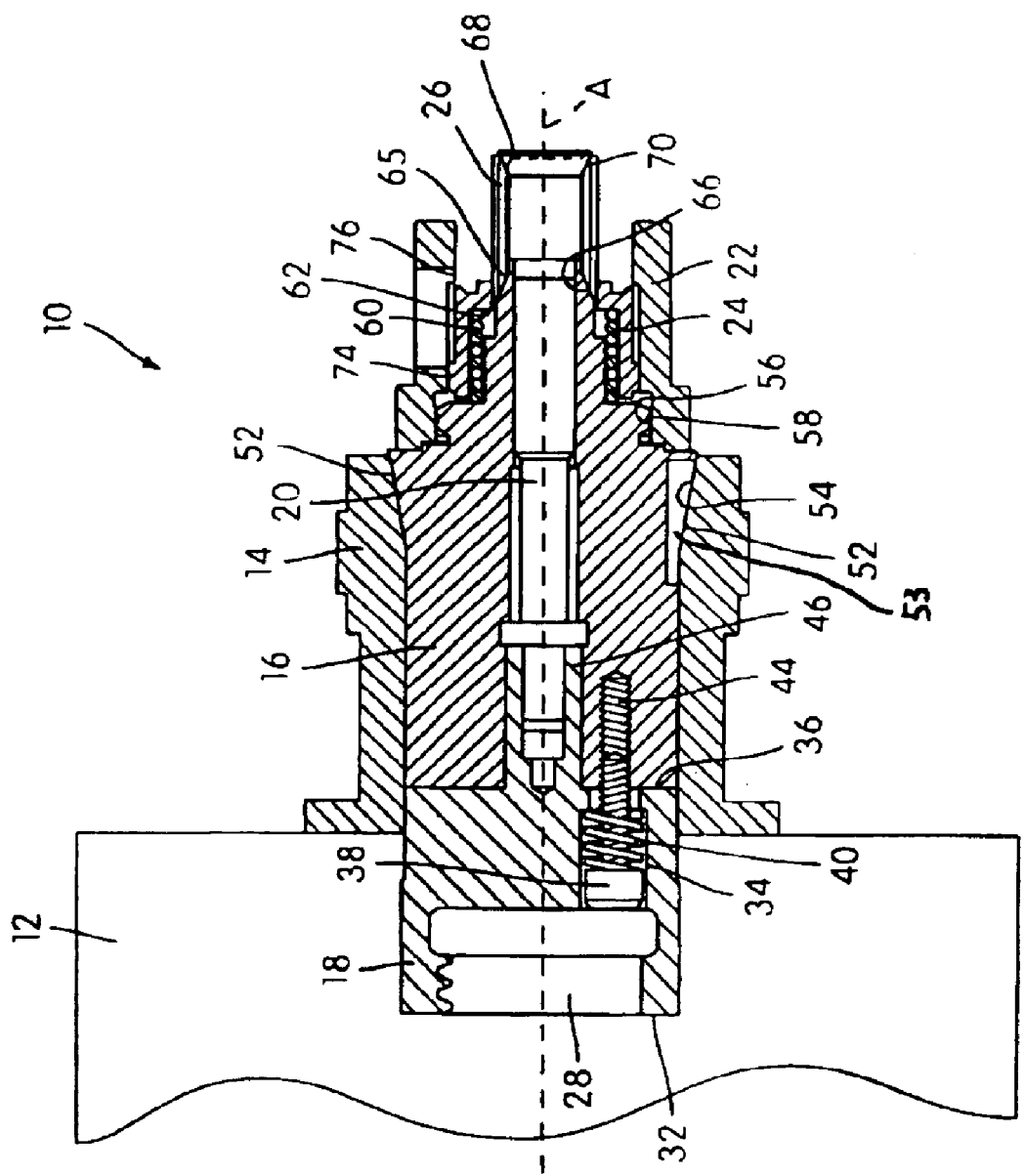
FIG. 1 is a cross-sectional view of an expanding collet assembly according to the present invention, shown as installed on a pick-off spindle assembly without a workpiece.

An expanding collet assembly according to the present invention, generally indicated at 10, is shown in the cross-sectional view of FIG. 1. The expanding collet assembly 10 is particularly adapted for gripping the inner diameter (ID) of a workpiece, rather than the outer diameter (OD), as will be explained below. As shown in FIG. 1, the collet assembly 10 is mounted to a pick-off spindle 12 of known and conventional construction, having a pick-off spindle nose 14. The collet assembly 10 itself is comprised of a moveable arbor 16, an arbor base 18, a draw plug 20, an ejector housing 22, an ejector 24, and an expanding collet 26. These components, their functions, and the operation of the expanding collet assembly 10 will be described below in greater detail.

Throughout the following description and claims, certain directional terms will be used, including "rearwardly-extending," "radially-extending," "forwardly-facing," etc. These terms are used with respect to the coordinate system of the Figures and are used to simplify the description. Where these terms are used to describe a force, direction, or other quantity, only one component of the force, direction or other quantity need be in the indicated direction, unless otherwise stated. Additionally, the term "axially," as used in the following description, is used with respect to the horizontal axis A shown in FIG. 1.

The arbor base 18 is mounted on the spindle 12 by means of a conventional bayonet connector 28, although it could also be mounted on the spindle 12 by means of inner or outer diameter threads, or other conventional means, depending on the design of the spindle 12. An appropriately dimensioned bayonet cavity 30 in the spindle-facing portion 32 of the arbor base 16 is provided to mate with the bayonet connector 28. Contiguous with and extending forwardly from the bayonet cavity 30 are three countersunk holes 34 spaced circumferentially about the arbor base 18 (only one is shown in the cross-sectional view of the Figures), which extend axially through the thickness of the arbor base 16 towards its forward portion 36. (The countersunk holes 34 are positioned such that they are accessible through the bayonet cavity 30 when the arbor base 18 is not connected to the spindle 12.) The countersunk holes 34 are sized to accommodate cap machine screws 38 and arbor return compression springs 40, one machine screw 38 and one compression spring 40 per countersunk hole 34. The arbor return compression springs 40 are inserted over the shafts of the cap machine screw 38 such that their ends are fixed for resilient movement between the cap screw 38 and the edges of the countersunk hole 34. One cap screw 38 and one compression spring 40 can be seen in FIG. 2, an exploded cross-sectional view of the expanding collet assembly 10, in which the spindle 12 and spindle nose 14 are not shown. (In the assembled cross-sectional view of FIG. 1, the cap screw 38 is partially obscured by the arbor return compression spring 40 which is mounted concentrically on it.) As mounted, the arbor base 18 is fixed in position with respect to the spindle 12.

In general, the moveable arbor 16 is connected with the arbor base in such a way that the moveable arbor 16 may travel axially, but is resiliently biased to return to a position in contact with the arbor base 18 in the absence of an external axial force. The way in which the arbor base 18 connects with the moveable arbor 16 will be described with respect to FIGS. 1 and 2. The moveable arbor 16 provides three internally threaded holes 44 spaced circumferentially about the arbor base and positioned such that they are in operative alignment with the countersunk holes 34 of the arbor base 18, such that the cap screws 38 may be threadedly secured into the moveable arbor 16. When the cap screw 38 are threadedly secured into the moveable arbor 16 and arbor base 18, the arbor return compression springs 40 provide a resilient bias that forces the moveable arbor 16 forward, unless the force bias of the pick off spindle nose 14 against the moveable arbor 16 overcomes the force bias of the arbor return compression springs 40, as will be described in more detail below. Although the use of three cap screws 38 and compression springs 40 have been described, any number may be used, depending on the amount of resilient bias that is desired between the moveable arbor 16 and arbor base 18. Additionally, those of ordinary skill in the art will realize that although the cap screw 38 and return compression spring 40 are described, the connection between the moveable arbor 16 and arbor base 18 may be by means of any connector that provides an appropriate resilient bias. The arbor base 18 also includes a forward projection 46 which inserts into a central cavity 48 provided in the moveable arbor 16.

Figure 2:
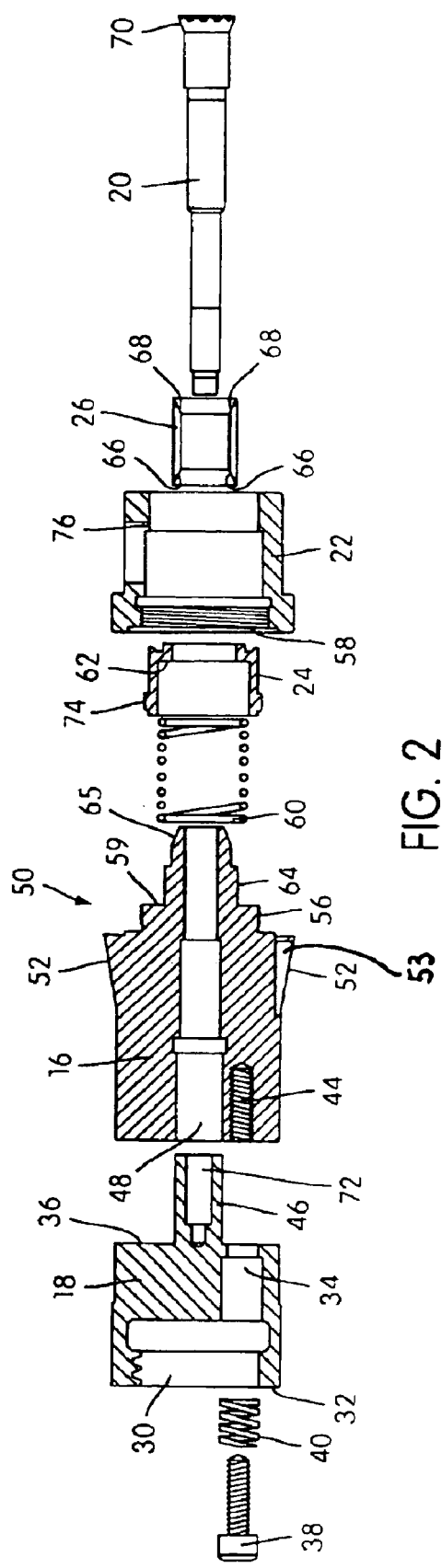
FIG. 2 is an exploded cross-sectional view of the collet assembly of FIG. 1.

The forward end of the moveable arbor, generally indicated at 50 in FIG. 2, connects with the other components of the expanding collet assembly 10, as shown in FIGS. 1 and 2. The forward end of the arbor 50 includes frustro-conical cam surfaces 52 which are constructed and arranged to engage corresponding frustro-conical cam surfaces 54 provided on the interior of the pick-off spindle nose 14. (Although the cam surfaces 52, 54 illustrated in the Figures are frustro-conical and of continuous slope, they need not be. The cam surfaces 52, 54 may have any appropriate mechanically motion-translating shape, depending on the configuration of the components.) In the Figures, adjacent to the bottom-most one of the cam surfaces 52 of the moveable arbor 16, one of the arbor keyways 53 is shown. Several keyways 53 may be provided, circumferentially spaced about the moveable arbor 16, in order to key the moveable arbor 16 into the pick-off spindle nose 14.

Just forward of the cam surfaces 52, the diameter of the forward end 50 of the moveable arbor 16 decreases and the arbor 16 defines a threaded portion 56 which is constructed and adapted to engage corresponding threads 58 on a rearward portion of the ejector housing 22 to connect the two components 18, 22. The ejector housing 22 may also be connected to the moveable arbor 16 by means of radially-positioned machine screws, set screws, or other similar fasteners.

Radially inward and forward of the threaded portion 56, the arbor 16 defines a radially-extending bearing surface 59. A compression spring 60 rests against the radially-extending bearing surface 59 of the arbor 16. The other end of the compression spring 60 bears against an inwardly radially-extending lip 62 of the ejector 24, such that the compression spring 60 is disposed in driving relation with the ejector 24. Operationally, the compression spring 60 and ejector 24 are concentrically mounted on the arbor 16 such that the compression spring 60 is in contact with a circumferential surface 64 of the arbor 16 and the ejector 24 is in contact with the circumferential outer surface of the compression spring 60, as shown in FIG. 1. The length and other characteristics of the compression spring 60 may be selected to suit the particular application in which the collet assembly 10 is being used, although relatively long travel lengths for the compression spring 60 and ejector 24 may be useful in ejecting workpieces.

The ejector 24 is confined within the ejector housing 22, which serves as a guide for the ejector 24. A flange or step 74 in the diameter of the ejector 24 and a corresponding lip 76 of the ejector housing 22 are used to retain the ejector 24 within the ejector housing 22. This will be described in more detail below.

Forward of the circumferential surface 64 on which the compression spring 60 rests, the moveable arbor 16 includes frustro-conical cam surfaces 65 that are contoured to slidingly engage a first set of corresponding frustro-conical cam surfaces 66 of the expanding collet 26. The expanding collet 26 includes a second set of frustro-conical cam surfaces 68 on its forward end. (As described above, the cam surfaces 66, 68 of the expanding collet 26 and the cam surfaces 64 of the arbor 16 may be of any engaging, mechanically motion-translating shape.)

The draw plug 20 provides a set of frustro-conical cam surfaces 70 that are constructed and arranged to slidingly engage the second set of frustro-conical cam surfaces 68 of the expanding collet 26. As shown, the draw plug 20 of the illustrated embodiment is an elongate rod having segments of consecutively decreasing diameter that are adapted to engage the various interior surfaces of the central cavity 48 of the arbor 16 and those of the corresponding cavity 72 in the forward projection 46 of the arbor base 18. When inserted into the cavity 72 in the arbor base 18 and secured therein (for example, by a threaded connection with the arbor base 18), the draw plug 20 is static with respect to the other components and the cam surfaces 70 of the draw plug 20 are in position to engage the can surfaces 68 of the expanding collet 26.

Figure 4:
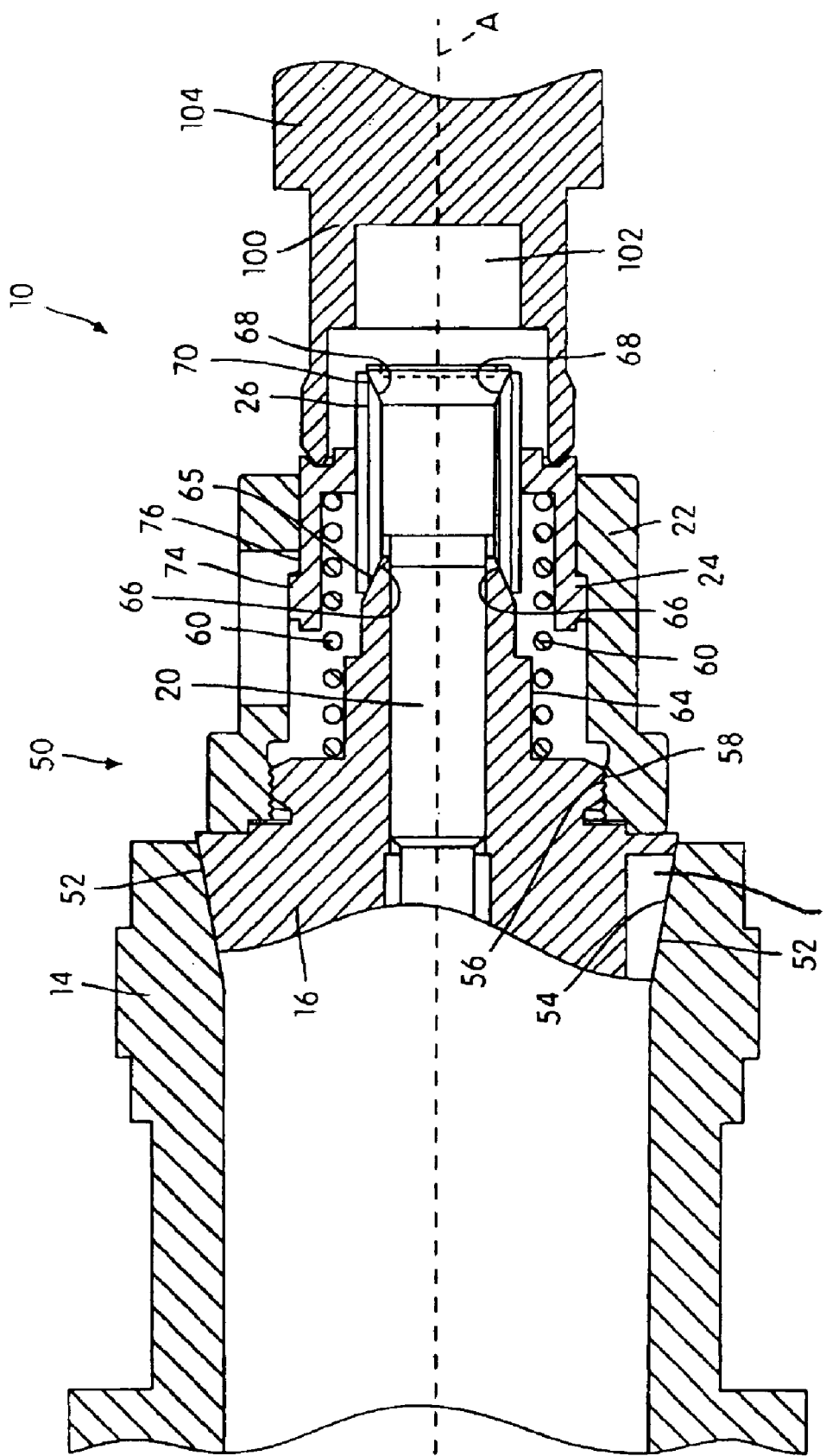
FIG. 4 is a cross-sectional view of the expanding collet assembly of FIG. 1 accepting a workpiece.
Figure 5:
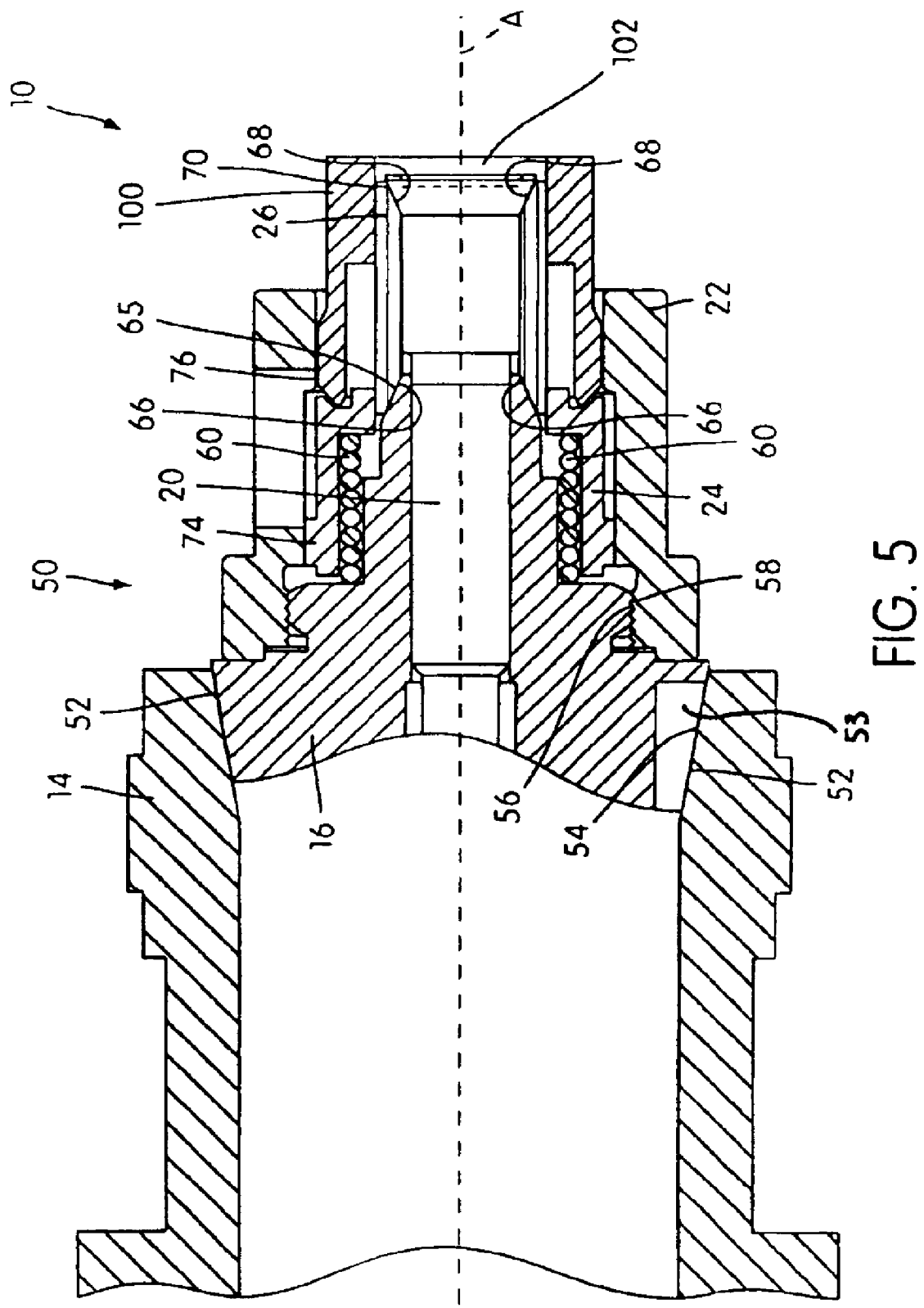
FIG. 5 is a cross-sectional view of the expanding collet assembly of FIG. 1, gripping a workpiece.

The operation of the expanding collet assembly 10 and its various components will be described with respect to FIGS. 3–5, which are cross-sectional views of the collet assembly 10 in various operational positions. For purposes of description only, the "initial" position of the collet assembly 10 may be considered to be the position illustrated in FIG. 4. In FIG. 4, the spindle nose 14 has been retracted, for example, by a piston (not shown) within the spindle 12 (not shown in FIG. 4). The expanding collet 26 is not expanded and there is no workpiece on the expanding collet 26. In the position illustrated in FIG. 4, the compression spring 60 is partially uncompressed, such that the ejector 24 is in a forward position, and is prevented from further forward movement by the action of its flange 74 against the lip 76 of the ejector housing 22. The arbor base 18 is not shown in FIG. 4, but in the position illustrated in FIG. 4, the arbor 16 would rest against the arbor base 18. For reference, a workpiece 100 is shown in FIG. 4. The workpiece 100 is an end portion of a piece of bar stock 104, and is beginning to contact the ejector 24 in the view of FIG. 4.

From the position illustrated in FIG. 4, the pick-off spindle 12 would travel towards the workpiece 100, for example, under computer control. The force bias of the workpiece 100 contacting the ejector 24 begins to compress the compression spring 60, until the expanding collet 26 is moved into position within the bore 102 of the workpiece 100.

Once the expanding collet 26 is in position within the bore 102 of the workpiece 100, the spindle nose 14 is caused to move forward (right, with respect to the Figures). This movement of the spindle nose 14 causes the moveable arbor 16 to move forward, which causes the expanding collet 26 to expand and grip the workpiece, because of the sliding engagement between the cam surfaces 64 of the moveable arbor 16 and the cam surfaces 66 of the expanding collet 26. The workpiece 100 is thus gripped, and can be cut from the bar stock 104 of which it is a part. FIG. 5 illustrates the workpiece 100 being gripped by the expanding collet 26 after being cut away from the bar stock 104. While the collet head 26 is expanded against the bore 102 of the workpiece 100, the frictional force between the collet head 26 and the bore 102 prevents the compression spring 60 from extending and causing the workpiece 100 to be ejected.

After work is complete on the workpiece 100, the spindle nose 14 is once again retracted, causing the moveable arbor 16 to retract and the expanding collet 26 to contract. This frees the workpiece 100. The compression spring 60 is then released and the ejector 24 consequently pushes the workpiece 100 away. The ejection of the workpiece 100 is shown in FIG. 3.

The expanding collet assembly 10 may have certain advantages, depending on how it is installed and used. In general, the expanding collet assembly may be installed on a multi-spindle automatic lathe, such as the EUROTURN 6/32 (Maxim International, Dayton, Ohio, USA). The expanding collet assembly 10 may fit into some pick-off spindle noses 18 in the same way as a standard OD gripping collet. The expanding collet assembly 10 also operates with a "push-to-grip" actuating motion, the same motion used by conventional collets, and so it would require the same actuating motions as a standard OD gripping collet. The expanding collet assembly 10 may also be easy to adapt to various jobs and differently sized workpieces 100. In most cases, the entire expanding collet assembly 10 would be swapped for one of a different size or other characteristic, but in some cases, only the expanding collet 26 itself would need to be changed in order to adapt the expanding collet assembly 10 for another machining job.

Figure 6:
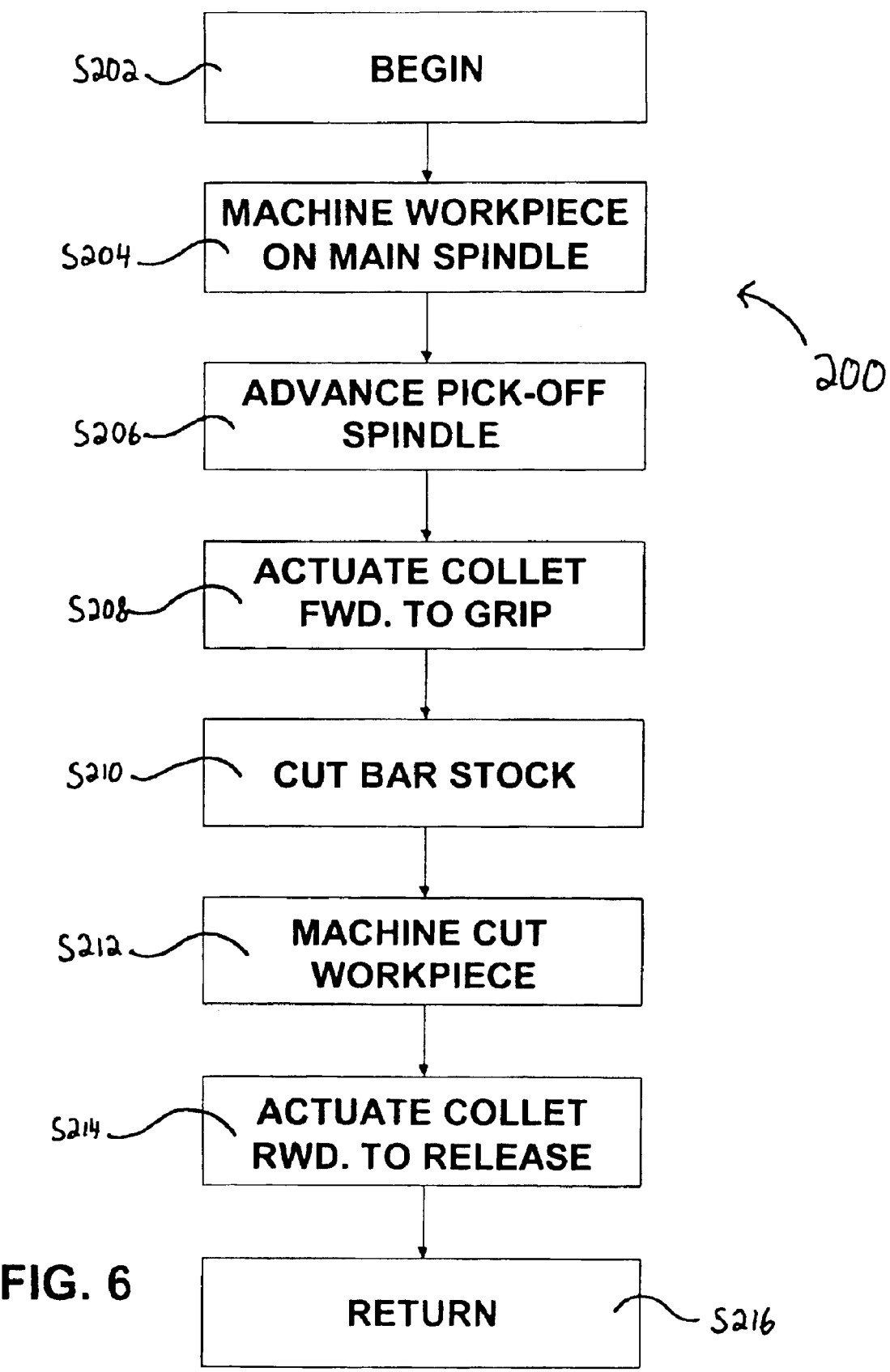
FIG. 6 is a high-level schematic flow diagram of a process for machining a workpiece using a collet assembly according to the present invention.

More generally, the expanding collet assembly 10 may be used in a method or process for machining the entire outer surface of a workpiece (i.e., without any portion of the surface being inaccessible due to OD gripping) by gripping the inner diameter of the workpiece. A method of this type, generally indicated at 200, is schematically illustrated in FIG. 6, a high-level flow diagram. The method begins at S202 and continues at S204. At S204, a workpiece 100 attached to bar stock 104 is machined on a first end by a main spindle of a multi-spindle lathe. The tasks of S204 are conventional and are described, for example, in U.S. Pat.

No. 5,207,135, which was incorporated by reference above. Once the workpiece 100 has been machined on the main spindle of the lathe at S204, method 200 continues with S206.

At S206, the pick-off spindle 12 of the lathe would be advanced toward the workpiece 100, typically under the control of a programmable logic controller or other controlled positioning device. During the movement, the rotational speed of the pick-off spindle 12 would typically be adjusted to match that of the main spindle. Once the expanding collet 26 was in position inside the bore 102 of the workpiece 100 (i.e., just beyond the position illustrated in FIG. 4), method 200 would continue with S208, at which time the moveable arbor 16 would be driven forwardly by the pick-off spindle nose, causing the expanding collet 26 to expand and grip the bore 102 of the workpiece 100. Method 200 would continue with S210, in which the workpiece 100 would be cut from the bar stock 104 by a blade, resulting in the position shown in FIG. 5. In S212, the entire workpiece 100 and, particularly, the entire outer surface of the workpiece 100, could be machined (if desired) while the workpiece 100 is gripped by the expanding collet assembly 10. If the outer surface of the workpiece 100 is machined, the ID gripping expanding collet assembly 10 would not create an obstruction.

Figure 3:
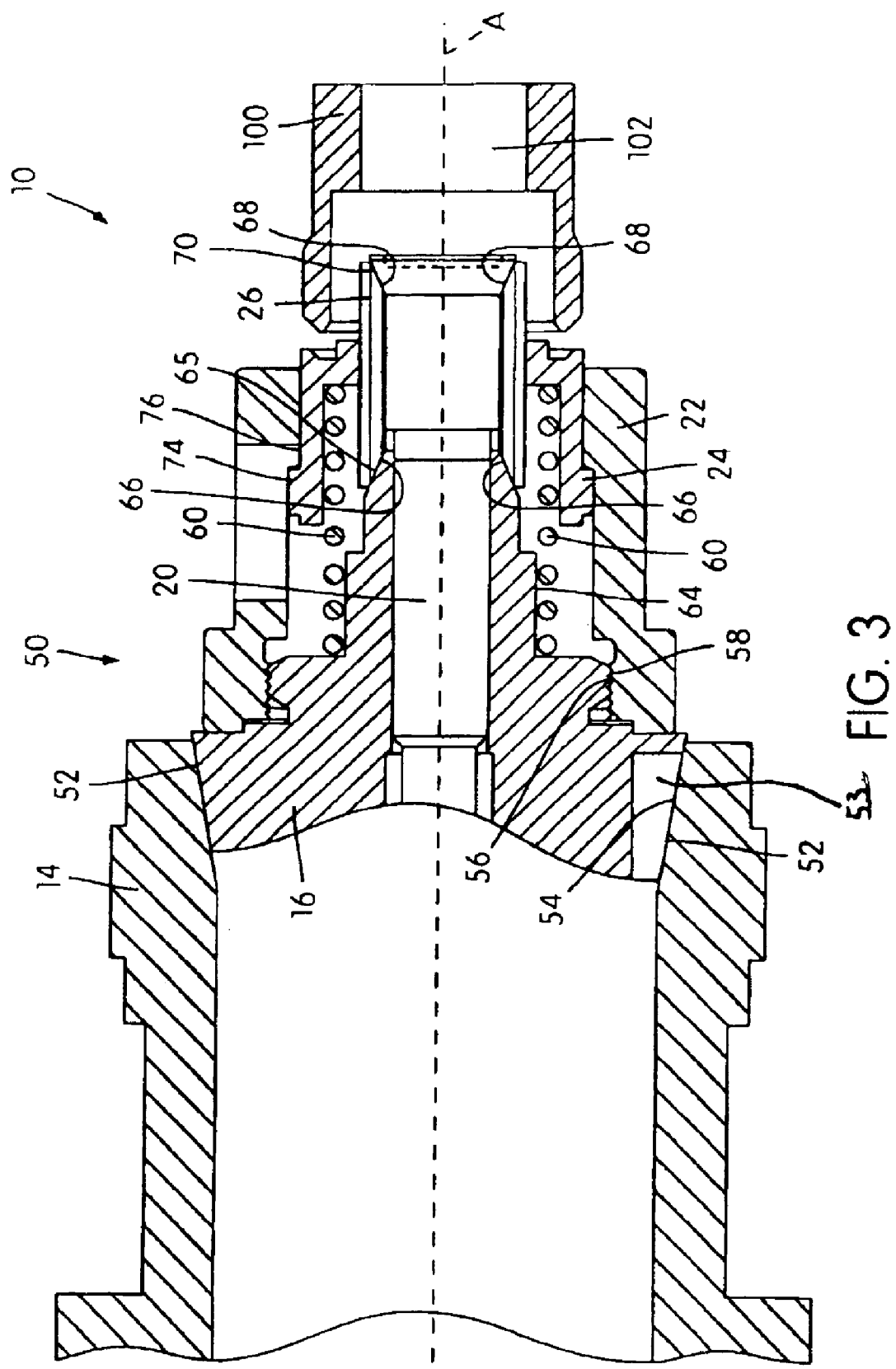
FIG. 3 is a cross-sectional view illustrating the expanding collet assembly of FIG. 1 ejecting a workpiece.

Once the workpiece 100 has been machined on the pick-off spindle 12, method 200 would continue with S214, in which the spindle nose 14 would drive the moveable arbor 16 rearwardly, causing the collet head 26 to contract and release the workpiece 100, as in the position of FIG. 3. Method 200 would then conclude at S216.

Although the invention has been described with respect to exemplary embodiments, those of ordinary skill in the art will realize that modifications and variations are possible, within the scope of the appended claims. The embodiments described herein are intended to be exemplary only and are not intended to limit the scope of the claims.

What is claimed is:

1. An expanding collet assembly, comprising:
  a moveable arbor having
    first surfaces constructed and arranged to slidingly engage a pick-off spindle nose so as to place said moveable arbor in driven relation with the pick-off spindle nose, and
    second motion-translating surfaces constructed and arranged to slidingly engage an expanding collet to drive said expanding collet between expanded workpiece-gripping positions and contracted positions thereof;
  an expanding collet having one or more sets of collet motion-translating surfaces, at least one of said one or more sets of collet motion-translating surfaces corresponding to the second motion-translating surfaces of said moveable arbor and being constructed and arranged to engage the second motion-translating surfaces of said moveable arbor,
  said collet and second motion-translating surfaces being contoured so as to drive said expanding collet into said expanded workpiece-gripping position in response to an axially forward motion of said moveable arbor; and
  an ejector assembly coupled to a forward end of said moveable arbor;
  wherein said expanding collet is adapted to grip an inner circumferential surface of a workpiece.

2. The expanding collet assembly of claim 1, further comprising:
  an arbor base constructed and arranged to be connected to the pick-off spindle at a first end and adapted to be moveably connected to said moveable arbor at a second end.

3. The expanding collet assembly of claim 2, said ejector assembly further comprising:
  an ejector housing connected to a forward end of said moveable arbor, said ejector housing having interior ejector-retaining structure;
  an ejector disposed within said ejector housing, said ejector having workpiece-contacting surfaces constructed and adapted to eject a workpiece from said expanding collet, said ejector being configured to be moved between retracted and ejecting positions; and
  a resilient elastic member disposed between said ejector housing and said ejector, said resilient elastic member being disposed in driving relation with respect to said ejector to drive said ejector between retracted and ejecting positions.

4. The expanding collet assembly of claim 3, wherein said moveable arbor, said expanding collet, said arbor base, said ejector housing and said ejector each define a central cavity, the central cavities being constructed and arranged so as to be operationally contiguous with one another.

5. The expanding collet assembly of claim 4, wherein said expanding collet includes two sets of collet motion-translating surfaces.

6. The expanding collet assembly of claim 5, further comprising an elongate drawplug, said drawplug being adapted to be inserted into the operationally-contiguous central cavities and having a set of drawplug motion-translating surfaces adapted to engage another of the two sets of collet motion-translating surfaces.

7. An inner diameter gripping collet assembly for a pick-off spindle, comprising:
  an arbor base, a first end of said arbor base providing a connecting portion adapted for connection to a pick-off spindle, a second end of said arbor base including resiliently moveable connecting structure, said arbor base defining a cavity in at least a portion thereof;
  a moveable arbor adapted to receive the resiliently moveable connecting structure of said arbor base so as to be connected to said arbor base for resilient movement between base-adjacent and axially forward positions along a central axis, said moveable arbor defining an interior cavity therethrough, said interior cavity being oriented parallel to the central axis, said moveable arbor having:
    outer surfaces constructed and arranged to slidingly engage corresponding inner surfaces of a pick-off spindle nose so as to be in driven, motion-transmitting relation therewith;
    motion-translating surfaces; and
    ejector housing connecting structure on a portion thereof;
  an ejector housing adapted to be connected to said moveable arbor by said ejector housing connecting structure, said ejector housing having retaining structure on an interior surface thereof;
  an ejector adapted to be disposed within and retained by said ejector housing for resilient, sliding movement between workpiece-engaged and workpiece-ejected positions, said ejector having surfaces adapted to contact and eject a workpiece and retaining structure adapted to cooperate with the retaining structure of said ejector housing so as to retain said ejector within said ejector housing;

an elongate drawplug adapted to be inserted parallel to the central axis into the cavity of said moveable arbor and secured into said arbor base, one end of said drawplug having motion-translating surfaces;

an expanding collet having two sets of motion-translating collet surfaces, a first set of motion-translating collet surfaces being constructed and adapted to engage the motion-translating surfaces of said moveable arbor and a second set of motion-translating collet surfaces being adapted to engage the motion-translating surfaces of said drawplug so as to place the expanding collet in grippingly-driven relation with respect to said moveable arbor such that said expanding collet is (1) expanded when said moveable arbor is in the axially forward position and (2) contracted when said moveable arbor is in the base-adjacent position.

8. The collet assembly of claim 7, wherein the connecting portion of said arbor base is a bayonet connector.

9. The collet assembly of claim 8, wherein the connecting portion of said arbor base comprises a threaded portion constructed and arranged to threadedly engage the pick-off spindle.

10. The collet assembly of claim 7, wherein the resiliently moveable connecting structure comprises one or more sets of a machine screw coupled with a compression spring.

11. The collet assembly of claim 7, wherein the ejector housing connecting structure of said moveable arbor comprises a threaded arbor portion constructed and arranged to threadedly engage a correspondingly threaded portion of said ejector housing.

12. A turning machine comprising a main spindle and a pick-off spindle, the turning machine having installed therein an inner diameter gripping collet assembly, comprising:

an arbor base, a first end of said arbor base providing a connecting portion adapted for connection to a pick-off spindle, a second end of said arbor base including resiliently moveable connecting structure, said arbor base defining a cavity in at least a portion thereof;

a moveable arbor adapted to receive the resiliently moveable connecting structure of said arbor base so as to be connected to said arbor base for resilient movement between base-adjacent and axially forward positions along a central axis, said moveable arbor defining an interior cavity therethrough, said interior cavity being oriented parallel to the central axis, said moveable arbor having:
  outer surfaces constructed and arranged to slidingly engage corresponding inner surfaces of a pick-off spindle nose so as to be in driven, motion-transmitting relation therewith;
  motion-translating surfaces; and
  ejector housing connecting structure on a portion thereof;

an ejector housing adapted to be connected to said moveable arbor by said ejector housing connecting structure, said ejector housing having retaining structure on an interior surface thereof;

an ejector adapted to be disposed within and retained by said ejector housing for resilient, sliding movement between workpiece-engaged and workpiece-ejected positions, said ejector having surfaces adapted to contact and eject a workpiece and retaining structure adapted to cooperate with the retaining structure of said ejector housing so as to retain said ejector within said ejector housing;

an elongate drawplug adapted to be inserted parallel to the central axis into the cavity of said moveable arbor and secured into said arbor base, one end of said drawplug having motion-translating surfaces;

an expanding collet having two sets of motion-translating collet surfaces, a first set of motion-translating collet surfaces being constructed and adapted to engage the motion-translating surfaces of said moveable arbor and a second set of motion-translating collet surfaces being adapted to engage the motion-translating surfaces of said drawplug so as to place the expanding collet in grippingly-driven relation with respect to said moveable arbor such that said expanding collet is (1) expanded when said moveable arbor is in the axially forward position and (2) contracted when said moveable arbor is in the base-adjacent position.

13. A turning machine, comprising:

a main spindle adapted to accept a workpiece integrally formed with a piece of bar stock;

a pick-off spindle having a pick-off spindle nose; and an expanding collet assembly, comprising:
  a moveable arbor having
    first surfaces constructed and arranged to slidingly engage the pick-off spindle nose so as to place said moveable arbor in driven relation with the pick-off spindle nose, and
    second motion-translating surfaces constructed and arranged to slidingly engage an expanding collet to drive said expanding collet between expanded workpiece-gripping positions and contracted positions thereof;
  an expanding collet having one or more sets of collet motion-translating surfaces, at least one of said one or more sets of collet motion-translating surfaces corresponding to the second motion-translating surfaces of said moveable arbor and being constructed and adapted to engage the second motion-translating surfaces of said moveable arbor, said collet and second motion-translating surfaces being contoured so as to drive said expanding collet into said expanded workpiece-gripping position in response to an axially forward motion of said moveable arbor; and
  an ejector assembly coupled to a forward portion of the moveable arbor;

wherein said expanding collet is adapted to grip an inner circumferential surface of a workpiece.

14. A gripping assembly for a pick-off spindle, comprising:

engaging means for engaging the pick-off spindle;

workpiece gripping means for gripping an inner circumferential surface of a workpiece; and actuating means coupled to said engaging means and said workpiece gripping means for actuating said workpiece gripping means between gripping and releasing positions thereof; and ejecting means coupled to said workpiece gripping means and said engaging means for ejecting said workpiece from said workpiece gripping means when said workpiece gripping means is in the releasing position thereof;

wherein said actuating means actuates said workpiece gripping means forwardly into a gripping position and rearwardly into a releasing position.

* * * * *